US012747978B2

(12) United States Patent
Rauer et al.

(10) Patent No.: US 12,747,978 B2
(45) Date of Patent: Sep. 29, 2026

(54) METHOD FOR NOISE DIAGNOSIS, METHOD FOR SIGNAL CONTROL, DIAGNOSIS DEVICE AND RADIOMATIC LEVEL MEASURING DEVICE

(71) Applicant: VEGA Grieshaber KG, Wolfach (DE)

(72) Inventors: Winfried Rauer, Fischerbach (DE); Matthias Harter, Schenkenzell (DE)

(73) Assignee: VEGA Grieshaber KG, Wolfach (DE)

( * ) Notice: Subject to any disclaimer, the term of this patent is extended or adjusted under 35 U.S.C. 154(b) by 317 days.

(21) Appl. No.: 18/415,232

(22) Filed: Jan. 17, 2024

(65) Prior Publication Data

US 2024/0240982 A1 Jul. 18, 2024

(30) Foreign Application Priority Data

Jan. 17, 2023 (DE) ..................... 10 2023 100 975.3

(51) Int. Cl.
*G01F 25/20* (2022.01)
*G01F 23/288* (2006.01)

(52) U.S. Cl.
CPC ............ *G01F 25/20* (2022.01); *G01F 23/288* (2013.01)

(58) Field of Classification Search
CPC ........ G01F 25/20; G01F 23/288; G01F 25/24; G01F 23/2885; G01T 7/005; G01T 1/16; G01R 29/26
See application file for complete search history.

(56) References Cited

U.S. PATENT DOCUMENTS 8,569,683 B2 * 10/2013 Freiburger ................ G01T 1/40 250/363.01
8,604,414 B2 12/2013 Rauer et al.
2010/0243878 A1 * 9/2010 Freiburger ................ G01T 1/40 250/363.01
2020/0044109 A1 2/2020 Azuma et al.
2021/0181006 A1 * 6/2021 Laun ......................... G01T 1/17

FOREIGN PATENT DOCUMENTS

| | | | |
|---|---|---|---|
| CN | 104 199 078 | A | 12/2014 |
| DE | 10 2013-215 606 | A1 | 2/2015 |
| DE | 10 2013 022 357 | B3 | 5/2022 |
| EP | 2 237 073 | A1 | 10/2010 |
| EP | 2 584 379 | A1 | 4/2013 |
| EP | 3 255 461 | A1 | 12/2017 |
| JP | 2000258537 | A * | 9/2000 |
| SU | 1168866 | A1 * | 7/1985 |

OTHER PUBLICATIONS

German Office Action issued Dec. 1, 2023 in German Application No. 10 2023 100 975.3, 6 pgs.

* cited by examiner

*Primary Examiner* — Francis C Gray
(74) *Attorney, Agent, or Firm* — Oblon, McClelland, Maier & Neustadt, L.L.P.

(57) ABSTRACT

A method for signal diagnosis, in particular for noise detection, of a radiometric sensor, that includes detecting of a first pulse rate by way of a first discriminator and a first counting circuit, detecting of at least a second pulse rate by way of a second discriminator and a second counting circuit, wherein the amplitude sensitivity of the first discriminator is different from the amplitude sensitivity of the second discriminator, determining a ratio between the detected pulse rate of the second discriminator and the detected pulse rate of the first discriminator, and comparing the determined ratio with an expected value.

18 Claims, 5 Drawing Sheets

METHOD FOR NOISE DIAGNOSIS, METHOD FOR SIGNAL CONTROL, DIAGNOSIS DEVICE AND RADIOMATIC LEVEL MEASURING DEVICE

CROSS-REFERENCE TO RELATED APPLICATIONS

This application claims the benefit of the filing date of German Patent Application No. 10 2023 100 975.3 filed on 17 Jan. 2023, the entire content of which is incorporated herein by reference.

TECHNICAL FIELD

The present disclosure relates to a method for noise diagnosis. Furthermore, the present disclosure relates to a method for signal control, a diagnostic device for a radiometric detector and a radiometric level measuring device with such a diagnostic device.

BACKGROUND

Radiometric measuring devices use a discriminator and a counting unit to count pulses. Changes in the amplitudes of the received signal pulses, which can be caused by temperature drifts, often lead to changes in the frequency distribution of the measured pulses. This may falsify the measurement results.

It has become apparent that there is a need to improve the measurement or the measured values of a radiometric measuring device.

There may be a desire to provide a method for noise diagnosis. There may also be a desire to provide a method for signal control, a diagnostic device for a radiometric detector and a radiometric level measuring device with such a diagnostic device.

These and other desires, which will be mentioned when reading the following description or which can be recognized by the skilled person, are met by the subject matter of the independent claims. The dependent claims relate to central ideas of the present disclosure in a particularly advantageous manner.

SUMMARY

According to a first aspect of the present disclosure, a method for signal diagnosis is provided, in particular for noise detection, of a radiometric sensor comprising:

- detecting of a first pulse rate by means of a first discriminator and a first counting unit;
- detecting of at least a second pulse rate by means of a second discriminator and a second counting unit, wherein
- the amplitude sensitivity of the first discriminator is different from the amplitude sensitivity of the second discriminator;
- determining a ratio between the detected pulse rate of the second discriminator and the detected pulse rate of the first discriminator; and
- comparing the determined ratio with an expected value.

Each discriminator may also be referred to as a comparator. The first and second discriminators and the first and second counting units are each used to count pulses. The first and second discriminators have different amplitude sensitivities. This means that the first and second discriminators each have different limit values for the amplitudes of the pulses from which a pulse is counted.

The expected value is a predefined value at which there is low or negligible noise.

The pulse rate corresponds to the sum of the measured pulses of a discriminator. When determining the ratio between the detected pulse rate of the second discriminator and the detected pulse rate of the first discriminator, a quotient is formed between the two pulse rates. The ratio can be used to detect whether there is an increased noise level that influences the measured value.

In an embodiment, the amplitude sensitivity of the first discriminator is higher than the amplitude sensitivity of the second discriminator. The first discriminator is preferably a measurement discriminator.

In an embodiment, the method further comprises:

- reducing or increasing the amplitude sensitivity of the first discriminator if the determined ratio deviates from the expected value. This allows the ratio to be approximated to the expected value and the noise to be reduced in this way.

In an embodiment, the first discriminator is a measurement discriminator, wherein the method further comprises: Determining the second discriminator as a measurement discriminator when the determined ratio deviates from the expected value. In this way, the noise level can be easily adjusted. In this way, a measured value can still be determined even with increased noise.

In an embodiment, the method further comprises:

- detecting a third pulse rate by means of a third discriminator and a third counting unit; the third discriminator having a lower or higher amplitude sensitivity than the first discriminator and a higher amplitude sensitivity than the second discriminator; determining the ratio between the detected pulse rate of the first discriminator and the detected pulse rate of the third discriminator, the first discriminator being the measurement discriminator; and comparing the determined ratio with an expected value. The third discriminator enables the formation of further ratios and consequently better noise detection.

In an embodiment, the method further comprises:

- determining the third discriminator as a measurement discriminator if the determined ratio deviates from the expected value. In this way, a measured value can still be determined even with increased noise.

In an embodiment, the method further comprises:

- determining a ratio between the detected pulse rate of the second discriminator and the detected pulse rate of the third discriminator; and comparing the determined ratio with the expected value.

In an embodiment, the method further comprises:

- outputting of a warning or error message if the determined ratio deviates from the expected value. In this way, a user can be notified if there is an increased noise level or if the measured values are falsified.

Another aspect of the present disclosure relates to a method for signal control (signal regulation) of a radiometric sensor, comprising:

- detecting a first pulse rate by means of a first discriminator, and a first counting unit;
- wherein the first discriminator is a measurement discriminator,
- detecting of a second pulse rate by means of a second discriminator and a second counting unit,
- detecting of a third pulse rate by means of a third discriminator and a third counting unit wherein the second discriminator has a lower amplitude sensitivity than the first discriminator and a higher amplitude sensitivity than the third discriminator;

Forming a ratio between the detected pulse rate of the third discriminator and the detected pulse rate of the second discriminator;

comparing the determined ratio with an expected value; and adjusting the amplification of the received pulse rates if the determined ratio deviates from the expected value.

The method enables automatic gain control or regulation. The second and third discriminators are used to determine the ratio between a pulse rate with a higher amplitude, i.e., with an energy that is greater than a first threshold value, and a pulse rate with an amplitude, i.e., with an energy that is greater than a second threshold value. For example, the threshold value for the third discriminator may be higher than the threshold value for the second discriminator. In other words, the amplitude sensitivities of the two aforementioned discriminators for automatic gain control are set lower than the amplitude sensitivity of the measured value discriminator or first discriminator. The first discriminator is used for the level measurement. This method may provide that the control is performed above the noise level and is therefore more stable.

In an embodiment, the gain is adjusted by changing the anode or cathode voltage on a photomultiplier and/or the supply voltage of a semiconductor detector, in particular a silicon photomultiplier.

In an embodiment, the amplification is adjusted at an electrical amplifier unit.

A further aspect of the present disclosure relates to a diagnostic device for a radiometric detector, which is adapted to perform a method according to one of the preceding embodiments.

A further aspect of the present disclosure relates to a radiometric level measuring device comprising a diagnostic device according to the preceding embodiment.

DESCRIPTION OF EMBODIMENTS

A detailed description of the figures is given below:

DETAILED DESCRIPTION OF THE EMBODIMENTS

Figure 1:
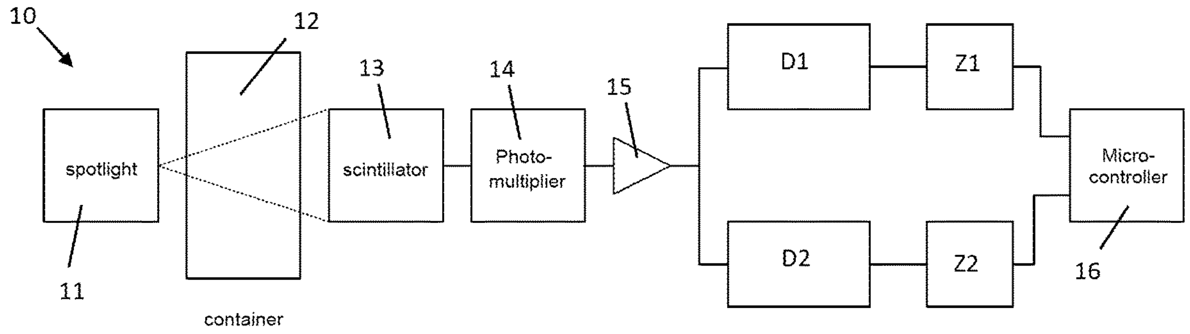
FIG. 1 shows a block diagram of a level measuring device with two discriminators.

FIG. 1 shows a structure of a radiometric measuring device 10. The measuring device 10 is, for example, a radiometric level measuring device, a radiometric density measuring device and/or a radiometric throughput measuring device. The measurement setup of a radiometric measurement with the measuring device 10 has a radioactive emitter 11. The emitter 11 is set up to emit gamma rays. The emitter 11 is arranged on a container 12 or directed towards the container 12.

The radiometric measuring device 10 with scintillator 13 is located on the opposite side of the container 12 to the emitter 11. The scintillator 13 is a body whose molecules are excited by impact processes when high-energy photons or charged particles pass through it and emit the excitation energy again in the form of light. In other words, the scintillator 13 converts gamma radiation into light pulses of variable intensity. The scintillation process can be triggered by the Compton effect or the photoelectric effect. The intensity distribution of the resulting light pulses is determined by the scintillation material and is therefore known.

A photomultiplier 14 is arranged on the scintillator 13. The photomultiplier 14 can also be referred to as a photoelectron multiplier. The photomultiplier 14 comprises an electron tube with the function of detecting the light signals generated in the scintillator 13 and generating an electrical signal of corresponding strength.

An amplifier 15 is located downstream of the photomultiplier 14 in order to amplify the electrical signals. After the amplifier 15, the resulting electrical signals or pulses can be tapped and analyzed.

The signal curves or pulses are tapped by a first discriminator D1 and a second discriminator D2. Discriminator D2, to each of which a first counting unit Z1 and a second counting unit Z2 are assigned. The first discriminator D1 and the second discriminator D2 have different amplitude sensitivities. In other words, the two discriminators D1, D2 are assigned different threshold values for detecting the signals. The respective time units Z1, Z2 therefore only count the signal pulses that exceed the predefined threshold value of the respective assigned discriminator D1, D2.

The pulse rates obtained from this are combined in a microcontroller 16. The microcontroller 16 sets the pulse rates in relation to each other. If the ratio deviates from a previously defined expected value, it can be concluded that there is increased noise.

Figure 2:
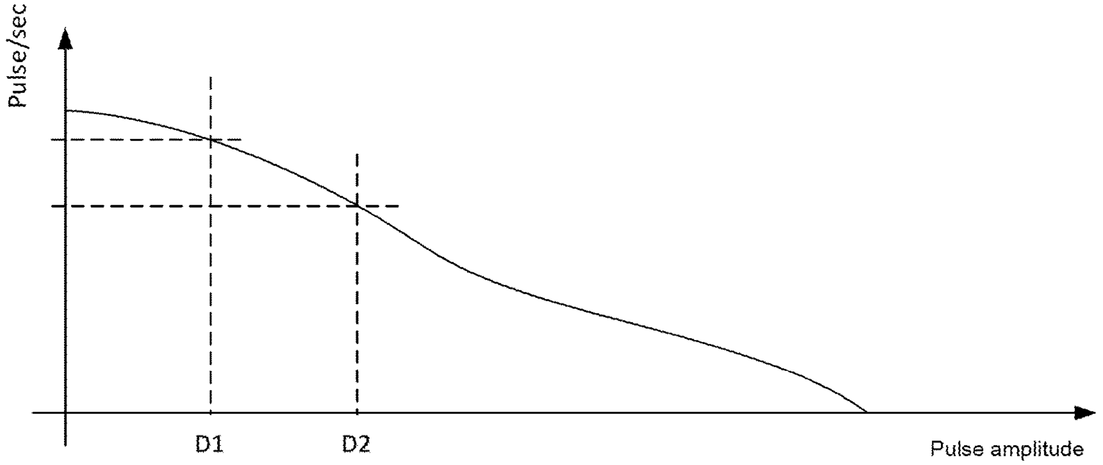
FIG. 2 shows a representation of an amplitude distribution with two discriminators.

FIG. 2 shows a typical amplitude distribution of a scintillator. The x-axis shows the pulse amplitude and the y-axis the frequency of the corresponding pulse amplitude. The curve shows the distribution of the frequency of the amplitudes. The positions of the threshold values of the first and second discriminator D1, D2 are entered on the x-axis. The first discriminator is defined here as a measurement discriminator. This means that the signals of the first discriminator D1 are used as measured values.

Figure 3:
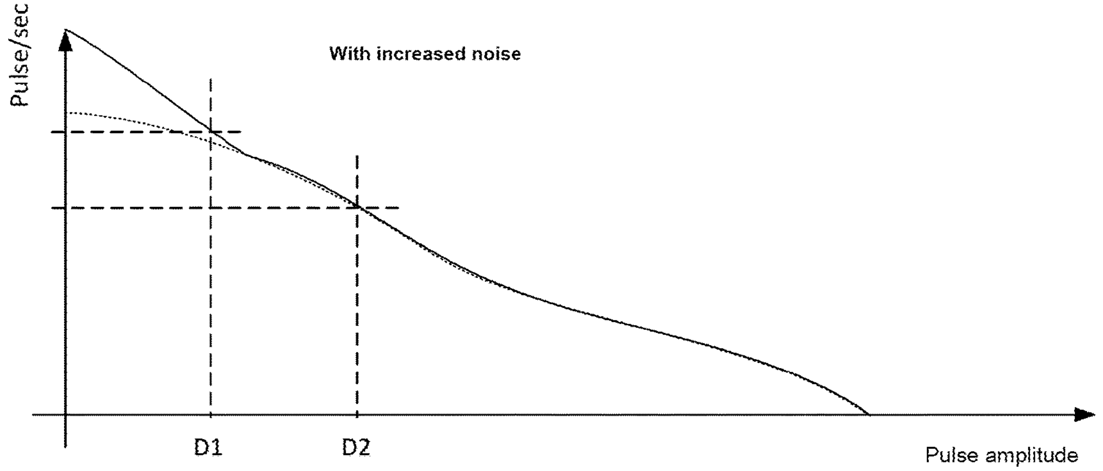
FIG. 3 shows a representation of an amplitude distribution with two discriminators with increased noise.

FIG. 3 shows a case in which pulses with small amplitudes occur more frequently. Instead of evaluating all pulse amplitudes, it may be sufficient in this example to set an amplitude sensitivity at the position of D1 and count the pulses whose pulse amplitudes are above this threshold. For the diagnosis, the ratio (D2/D1) of the pulse rate of the second discriminator D2 and the first discriminator D1 is formed. If the ratio deviates from the expected value, this is an indication of an increased noise level. Warning or error messages can be issued in response to this. If, for example, the first discriminator D1 is defined as a measurement discriminator, the amplitude sensitivity of the first discriminator D1 can be changed in response in order to continue measuring with lower sensitivity. In the event of short-term disturbances such as electromagnetic interference or EMC, the measured value can be frozen until the ratio is correct again. Alternatively, it is conceivable to define the second discriminator D2 as a measured value discriminator.

Figure 4:
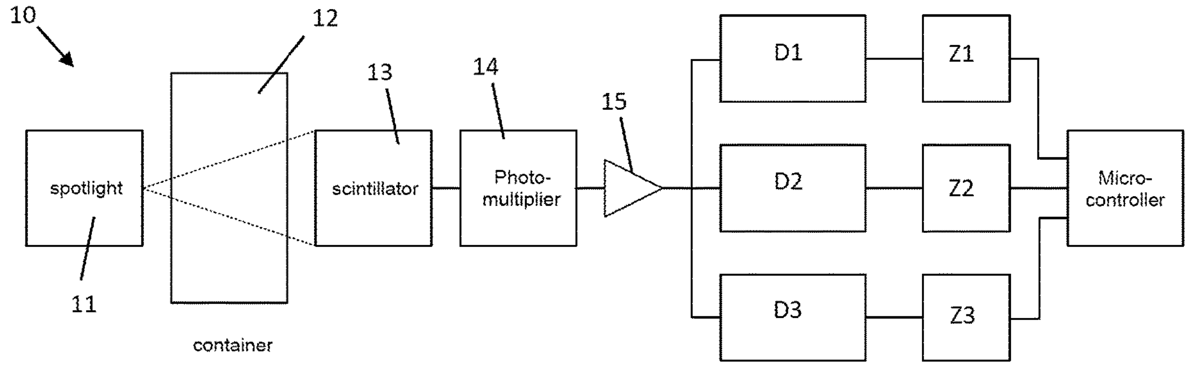
FIG. 4 shows a block diagram of a level measuring device with three discriminators.

FIG. 4 shows a further example of a measuring device with a third discriminator D3 and a third counting unit Z3. The other elements of FIG. 4 correspond to FIG. 1.

Figure 5:
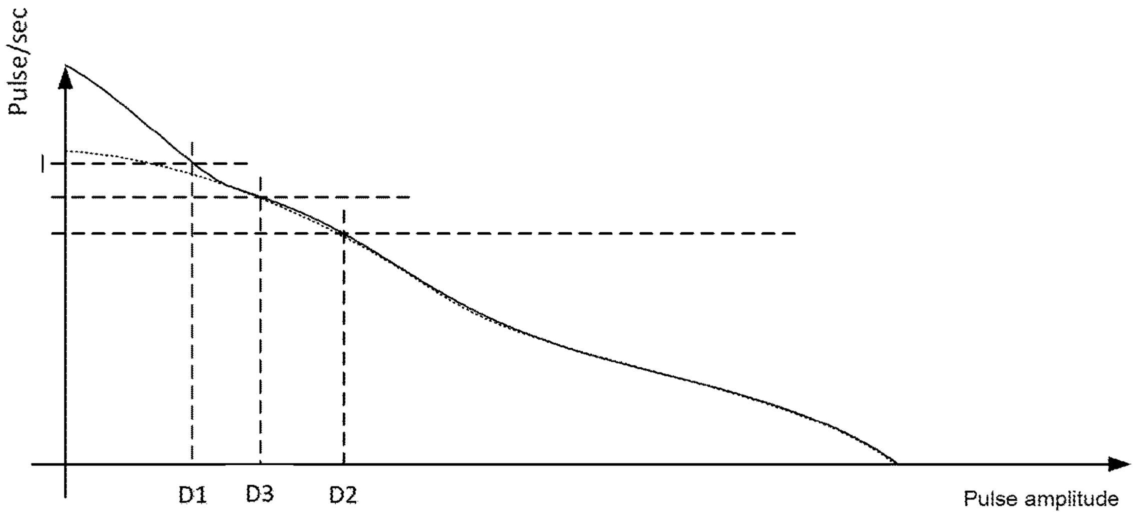
FIG. 5 shows a representation of an amplitude distribution with three discriminators.
Figure 6:
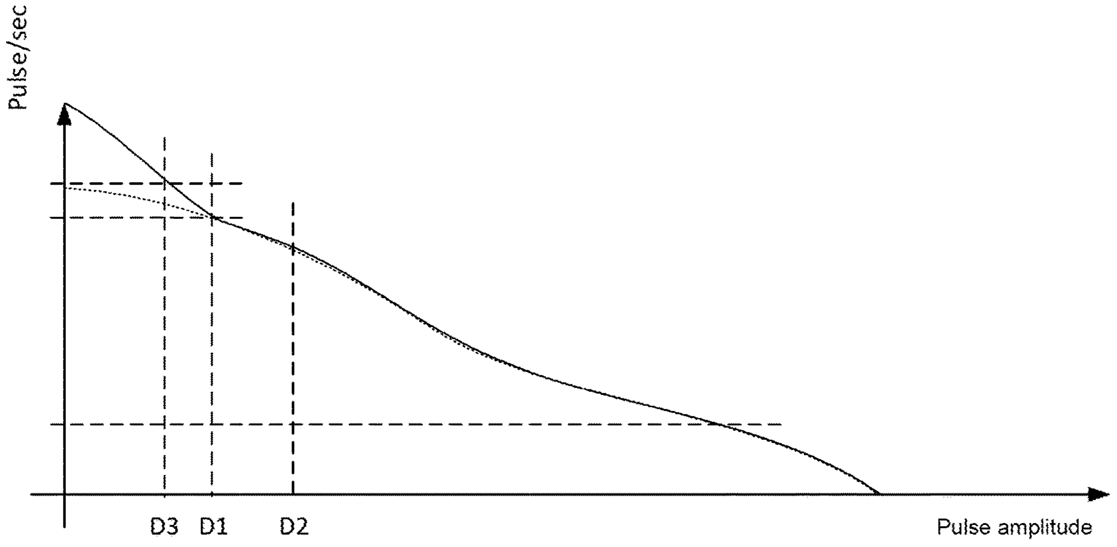
FIG. 6 shows a representation of an amplitude distribution with three discriminators.

FIG. 5 and FIG. 6 each show amplitude curves when three discriminators are used. In each case, the first discriminator is defined as the measurement discriminator. The ratio of the pulse rate of the second discriminator D2 and the first discriminator D1 is formed for the diagnosis. If the ratio deviates from an expected value, this is an indication of an increased noise level. In response to this, the discriminator D3 with a lower amplitude sensitivity than D1 can be used to determine the measured value.

In addition, the ratio between the second discriminator D2 and the third discriminator D3 can be formed to achieve a more accurate diagnosis. The second discriminator D2 and the third discriminator D3 can be set higher or lower than the first discriminator D1.

A distinction can be made between minor and major deviations and a warning or fault can be issued accordingly.

Figure 7:
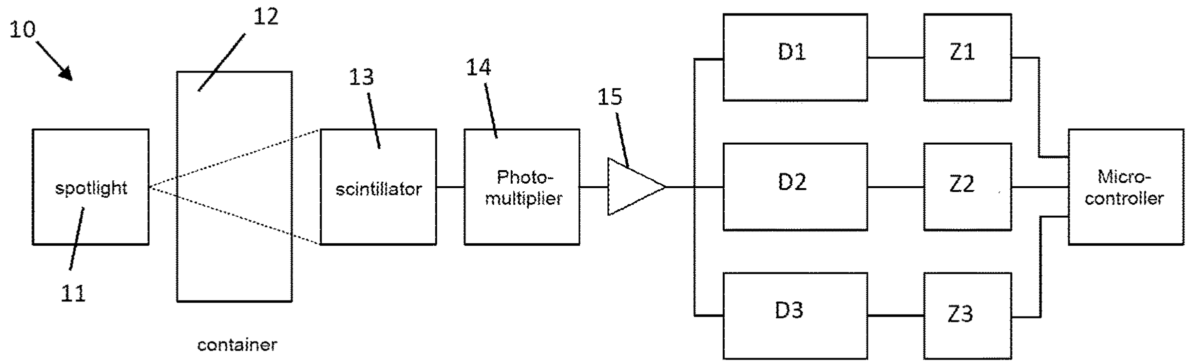
FIG. 7 shows a block diagram of a level measuring device with three discriminators.

FIG. 7 shows another radiometric measuring device with three discriminators. The structure of FIG. 7 corresponds to FIG. 4, but the function of the discriminators differs. The first discriminator D1 is defined as a measurement discriminator. This means that the first discriminator D1 is responsible for determining the measured value pulse rate. The first discriminator D1 is set very sensitively. Specifically, the first discriminator D1 has a higher amplitude sensitivity than the second and third discriminators D2, D3. Alternatively, only two discriminators are possible, whereby a further discriminator is used to detect the ratio.

Figure 8:
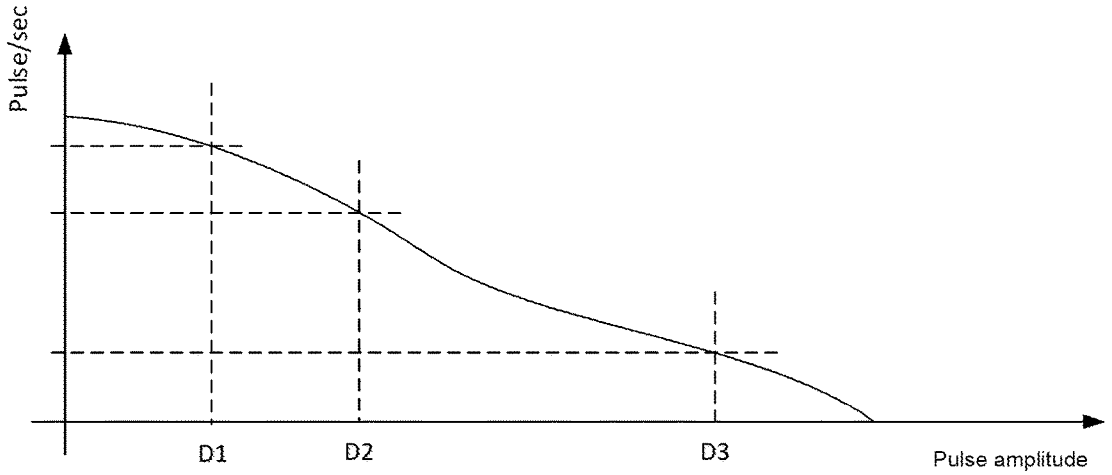
FIG. 8 shows a representation of an amplitude distribution with three discriminators.

The second and third discriminators D2, D3 are used for automatic gain control (temperature and ageing compensation). The amplitude sensitivities of the two discriminators D2, D3 for automatic gain control are usually set lower than the amplitude sensitivity of the measured value discriminator (see FIG. 8).

Figure 9:
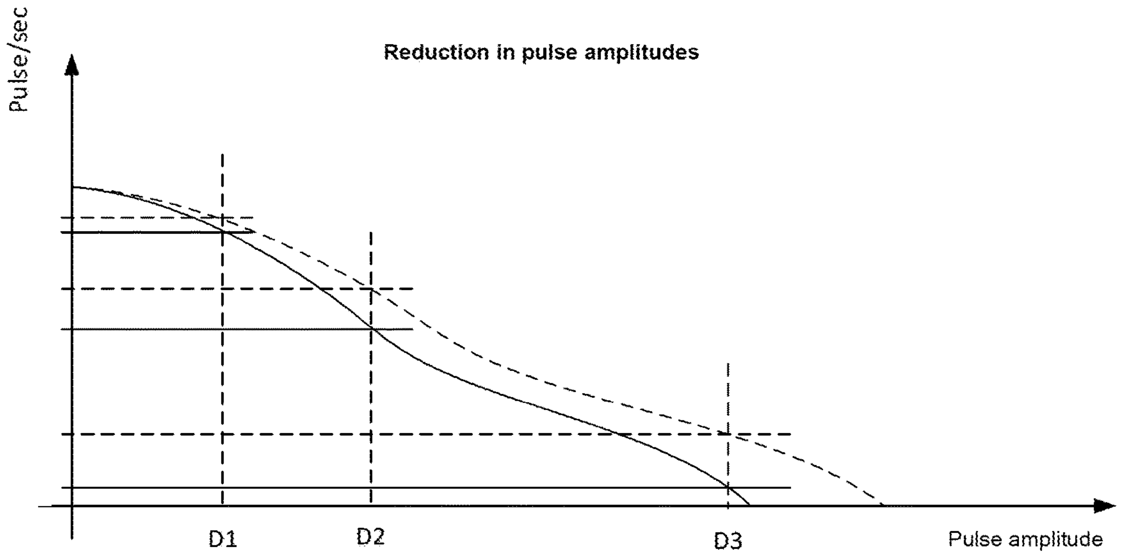
FIG. 9 shows a representation of an amplitude distribution with three discriminators with reduced pulse amplitudes.

For automatic gain control, the ratio of the pulse rate of the third discriminator D3 and the second discriminator D2 is formed. If the ratio deviates from an expected value, the gain is changed by the system to compensate for the temperature and ageing effects. In a photomultiplier, for example, the gain can be changed by changing the anode voltage. In the case of a silicon photomultiplier, for example, by changing the cathode voltage or by changing the electrical part, e.g., by means of an adjustable amplifier. Such a reduction in the amplitudes of the pulses is shown in FIG. 9.

Figure 10:
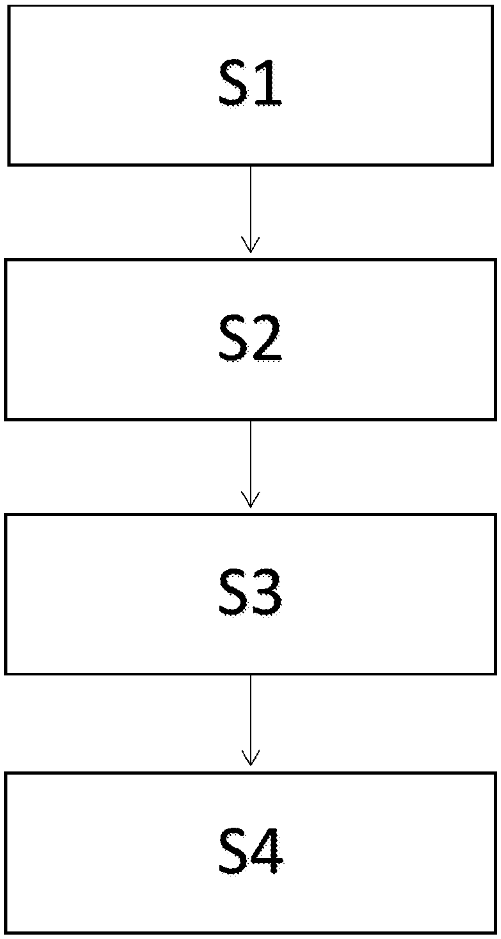
FIG. 10 shows a flow chart of an embodiment.

FIG. 10 shows a schematic representation of an embodiment of a method for signal diagnosis.

In a first step S1, a first pulse rate is detected by means of a first discriminator D1 and a first counting unit Z1;

In a second step S2, at least a second pulse rate is detected by means of a second discriminator D2 and a second counting unit Z2, wherein the amplitude sensitivity of the first discriminator D1 is different from the amplitude sensitivity of the second discriminator D2, wherein preferably the amplitude sensitivity of the first discriminator D1 is higher than that of the second discriminator D2;

In a third step S3, a ratio between the detected pulse rate of the second discriminator D2 and the detected pulse rate of the first discriminator D1 is determined.

Then, in the fourth step S4, the determined ratio is compared with a previously determined expected value.

Figure 11:
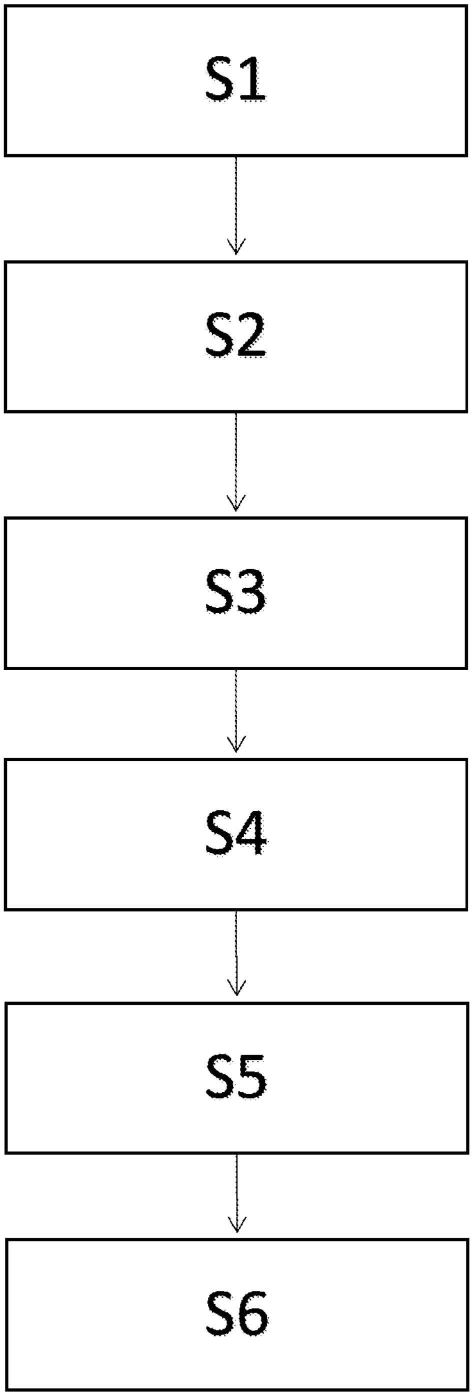
FIG. 11 shows a further flow chart of an embodiment.

FIG. 11 shows a method for signal control of a radiometric sensor.

In a first step S1, a first pulse rate is detected by means of a first discriminator D1 and a first counting unit Z1; wherein the first discriminator D1 is a measurement discriminator.

In a second step S2, a second pulse rate is detected by means of a second discriminator D2 and a second counting unit Z2.

In a third step S3, a third pulse rate is detected by means of a third discriminator D3 and a third counting unit Z3, wherein the second discriminator D2 has a lower amplitude sensitivity than the first discriminator D1 and a higher amplitude sensitivity than the third discriminator D3.

In a fourth step S4, a ratio is formed between the detected pulse rate of the third discriminator D3 and the detected pulse rate of the second discriminator D2.

In a fifth step, the calculated ratio is then compared with an expected value.

In a sixth step S6, the amplification of the received pulse rates is adjusted if the determined ratio deviates from the expected value.

However, the present disclosure is not limited to the preceding embodiments as long as it is encompassed by the subject matter of the following claims. In addition, it is noted that the terms "comprising" and "having" do not exclude other elements or steps and the indefinite articles "a" or "an" do not exclude a plurality. Furthermore, it is noted that features or steps described with reference to any of the above embodiments may also be used in combination with other features or steps of other embodiments described above.

LIST OF REFERENCE SYMBOLS

D1 first discriminator
D2 second discriminator
D3 third discriminator
Z1 first counting unit
Z2 second counting unit
Z3 third counting unit
10 Measuring device
11 Spotlights
12 Tank
13 Scintillator
14 Photomultiplier
15 Amplifier
16 Microcontroller

The invention claimed is:

1. A method for signal detection of a radiometric sensor, comprising:
- first detecting of a first pulse rate by way of a first discriminator and a first counting circuit;
- second detecting of at least a second pulse rate by way of a second discriminator and a second counting circuit, wherein a first amplitude sensitivity of the first discriminator is different from a second amplitude sensitivity of the second discriminator;
- determining a ratio between the second pulse rate of the second discriminator detected by the second detecting and the first pulse rate of the first discriminator detected by the first detecting; and
- comparing the determined ratio with an expected value, wherein the first amplitude sensitivity of the first discriminator is higher than the second amplitude sensitivity of the second discriminator.

2. The method according to claim 1, further comprising:
- decreasing or increasing the first amplitude sensitivity of the first discriminator if the determined ratio deviates from the expected value.

3. The method according to claim 1, wherein the first discriminator is a measurement discriminator and the method further comprises:

designating the second discriminator as a measurement discriminator if the determined ratio deviates from the expected value.

4. The method according to claim 1, further comprising:

detecting a third pulse rate by way of a third discriminator and a third counting circuit, wherein the third discriminator has a lower or higher amplitude sensitivity than the first discriminator and a higher amplitude sensitivity than the second discriminator;

determining a second ratio between the first pulse rate of the first discriminator and the third pulse rate of the third discriminator, wherein the first discriminator is a measurement discriminator; and comparing the determined second ratio with a second expected value.

5. The method according to claim 4, further comprising:

designating the third discriminator as a measurement discriminator if the determined ratio deviates from the second expected value.

6. The method according to claim 4 further comprising:

determining a ratio between the second pulse rate of the second discriminator and the third pulse rate of the third discriminator; and comparing the determined ratio with the second expected value.

7. The method according to claim 1, further comprising:

outputting a warning or error message if the determined ratio deviates from the expected value.

8. A method for signal control of a radiometric sensor, comprising:

detecting of a first pulse rate by way of a first discriminator, and a first counting circuit, wherein the first discriminator is a measurement discriminator;

detecting of a second pulse rate by way of a second discriminator and a second counting circuit;

detecting of a third pulse rate by way of a third discriminator and a third counting circuit, wherein the second discriminator has a lower amplitude sensitivity than the first discriminator and a higher amplitude sensitivity than the third discriminator;

determining a ratio between the third pulse rate of the third discriminator and the second pulse rate of the second discriminator;

comparing the determined ratio with an expected value; and adjusting amplification of received pulse rates if the determined ratio deviates from the expected value in the comparing, wherein a first amplitude sensitivity of the first discriminator is higher than a second amplitude sensitivity of the second discriminator.

9. The method according to claim 8, wherein a gain is adjusted by changing an anode or cathode voltage at a photomultiplier and/or a supply voltage of a semiconductor detector.

10. The method according to claim 8, wherein a gain is adjusted at an electrical amplifier circuit.

11. A diagnostic device for a radiometric detector comprising:

a first discriminator and a first counting circuit configured to first detect a first pulse rate;

a second discriminator and a second counting circuit configured to second detect at least a second pulse rate, wherein a first amplitude sensitivity of the first discriminator is different from a second amplitude sensitivity of the second discriminator; and circuitry configured to:

determine a ratio between the second pulse rate of the second discriminator detected by the second detection and the first pulse rate of the first discriminator detected by the first detection, and compare the determined ratio with an expected value, wherein the first amplitude sensitivity of the first discriminator is higher than the second amplitude sensitivity of the second discriminator.

12. A radiometric level measuring device comprising a diagnostic device according to claim 11.

13. The method according to claim 1, wherein the method is for noise detection.

14. The method according to claim 1, further comprising: decreasing or increasing the first amplitude sensitivity of the first discriminator if the determined ratio deviates from the expected value.

15. The method according to claim 5, further comprising:

determining a ratio between the second pulse rate of the second discriminator and the third pulse rate of the third discriminator; and comparing the determined ratio with the expected value.

16. The method according to claim 4, further comprising:

outputting a warning or error message if the determined ratio deviates from the expected value.

17. The method according to claim 8, wherein a gain is adjusted by changing an anode or cathode voltage at a photomultiplier and/or a supply voltage of a silicon photomultiplier.

18. The method according to claim 9, wherein the gain is adjusted at an electrical amplifier circuit.

* * * * *